July 16, 1957

J. DOTTO 2,799,367

MAGAZINE BRAKES

Filed April 30, 1954

INVENTOR.
John Dotto

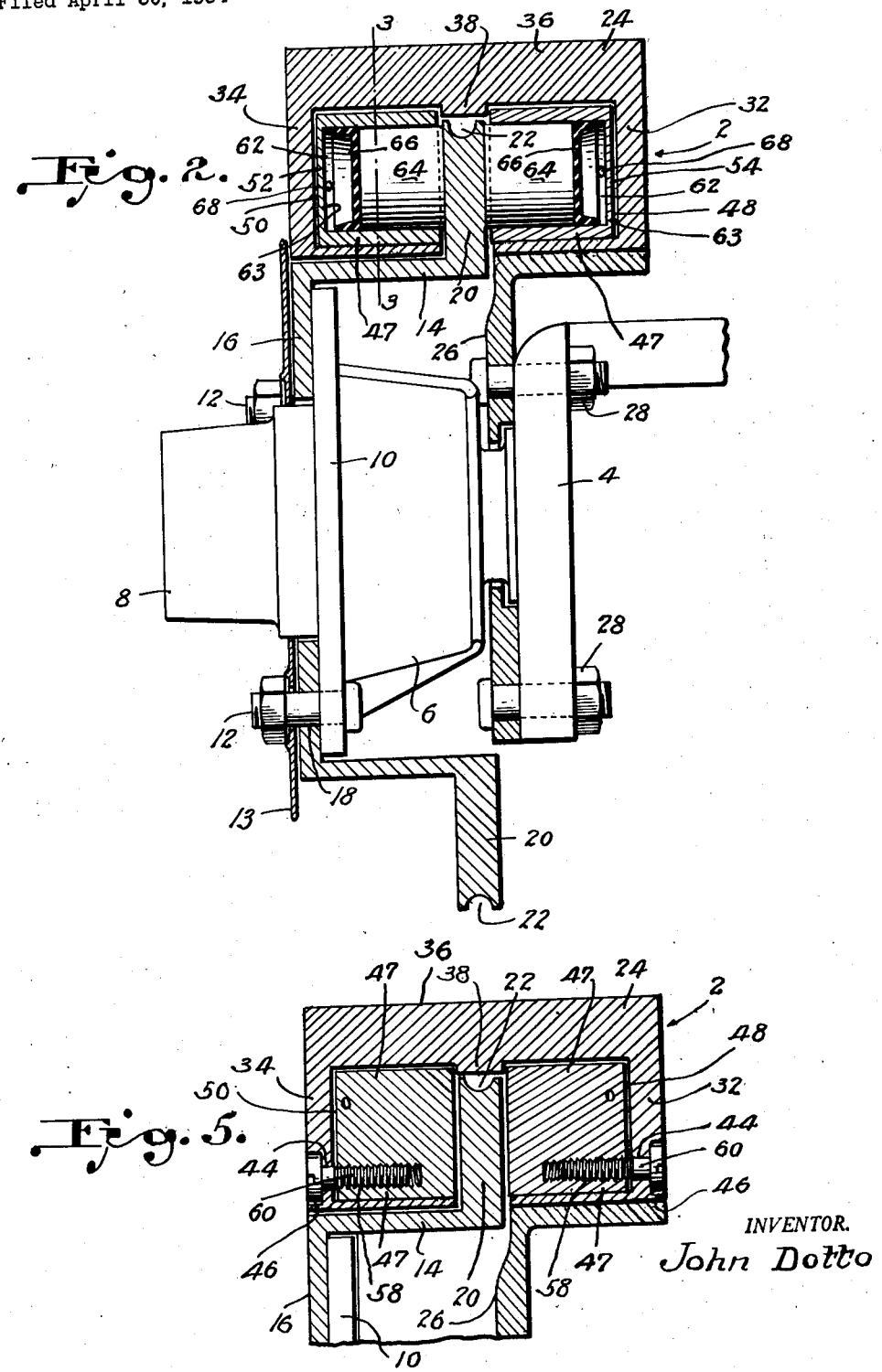

July 16, 1957  J. DOTTO  2,799,367
MAGAZINE BRAKES

Filed April 30, 1954  3 Sheets-Sheet 3

INVENTOR.
John Dotto

United States Patent Office 2,799,367
Patented July 16, 1957

2,799,367

MAGAZINE BRAKES

John Dotto, Meadville, Pa., assignor to Meadville Research Products Corporation, Meadville, Pa., a corporation of Pennsylvania Application April 30, 1954, Serial No. 426,757

11 Claims. (Cl. 188—73)

This invention relates to disc brakes and more particularly, to those of the spot type wherein plugs of friction material are pressed inwardly against opposite faces of a rotating disc.

The object of this invention is to provide a spot type disc brake assembly capable of stopping heavy vehicles smoothly within a few car-lengths, without undue heating, and with long service life. While prior brakes of this general type have shown great promise experimentally, they were subject to a number of practical defects which limited their commercial possibilities, particularly under conditions imposed in the automotive industry. Since the amount of braking is proportioned to the wear on plugs of friction material, the useful life of the plugs depends in part on their axial length. The object now is to provide a disc brake having comparatively long plugs without materially increasing the width of the brake assembly so that these brakes may be installed in the same region normally occupied by drum brakes.

Another object of the invention is to provide a disc brake having a minimum of working parts, and these being of extremely simple and durable configuration, and requiring no adjustment. Heretofore, where plugs of friction material were driven against disc faces by hydraulic pistons, the assemblies were characterized by their many parts, such as return springs for withdrawing the pistons, and by external adjusting mechanisms to compensate for plug wear. Now it is proposed to provide a brake wherein plugs of friction material are driven inwardly against the disc by a simple rubber plunger type of piston in the back or closed end of a hydraulic cylinder. When the hydraulic pressure fluid is released, the plugs are backed-off from the disc only slightly, enough to prevent wear of the plugs against the disc face so that the working faces of the plugs always lie close to the disc. In this manner, substantially the same length of pedal movement, and the same pedal force is used for setting the brakes when the plugs are worn thin as when they are new. This operation, plus the elimination of many moving parts, is intended to be accomplished by using the rotational forces and the lateral forces resulting from slight inherent disc wobble and un-evenness for backing the plugs away from the disc face.

Still another object is to provide a spot type disc brake wherein the plugs of friction material may be inspected and, if necessary, replaced, without having to dismantle the brake or remove the hydraulic pistons. For this purpose, it is intended to provide magazines for the plugs, one on each side of the disc, so that the magazines may be easily and quickly withdrawn to expose the plugs. In this mechanism, it is proposed that cylinders having closed outer ends be incorporated in the magazines, and that rubber-plunger pistons slidably fit in the closed outer ends behind the plugs, so that when the plugs are removed from the open inner ends of the cylinders, the plungers will prevent loss of brake fluid.

Still another feature of the invention is in providing a pair of removable plug and piston magazines which fit within pockets in opposite sides of a rigidly supported casing enshrouding a small sector of a disc, the object being that the casing shall absorb and withstand the heavy mechanical stresses which tend to spread apart the opposite sides of the brake when the plugs in the two magazines are forced inwardly against the disc. By this arrangement also, the casings and magazines may be mass-produced without close machining, insertion of the magazines in their pockets requires no close fitting, and the tolerances between all moving parts are non-critical so that operation of the brake is not affected by whatever foreign particles might lodge therebetween.

These and other objects will be apparent from the following specification and drawings, in which:

Fig. 2 is a vertical cross-section through the brake taken transversely substantially along the line 2—2 of Fig. 1, but diagrammatically illustrating fragments of the standard front wheel, axle and mounting parts of an automobile;

Fig. 5 is a vertical cross-section taken transversely along the line 5—5 of Fig. 1; and, Fig. 6 is an isometric view of the brake removed from the wheel, and showing the magazines withdrawn from the casing.

Figure 1:
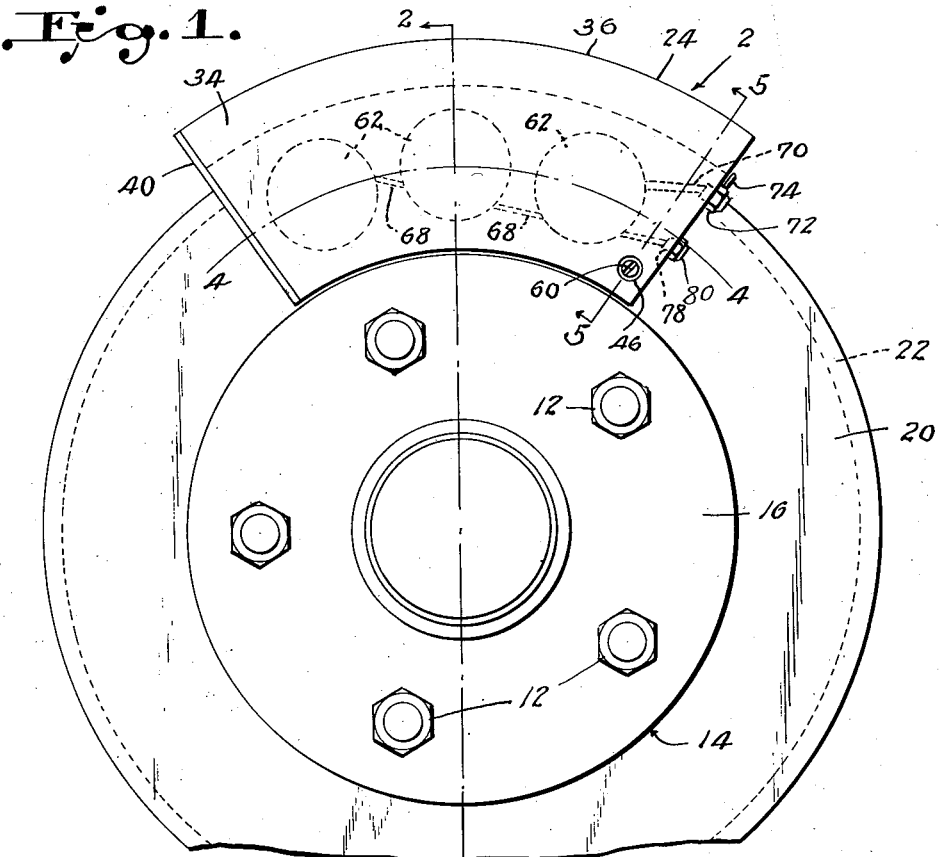
Fig. 1 is a side elevation showing the brake in a typical installation on an automobile front end, with the automobile wheel removed.
Figure 4:
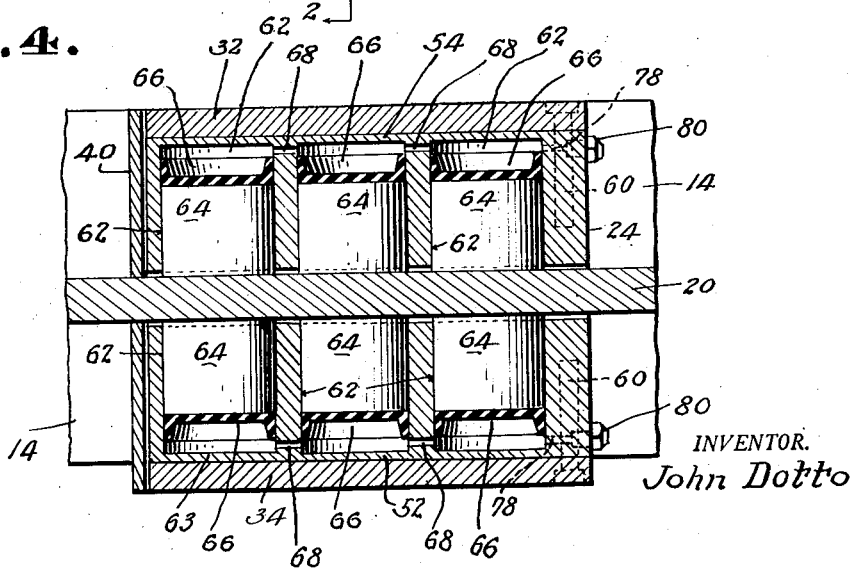
Fig. 4 is a longitudinal cross-section taken horizontally along the line 4—4 of Fig. 1.
Figure 3:
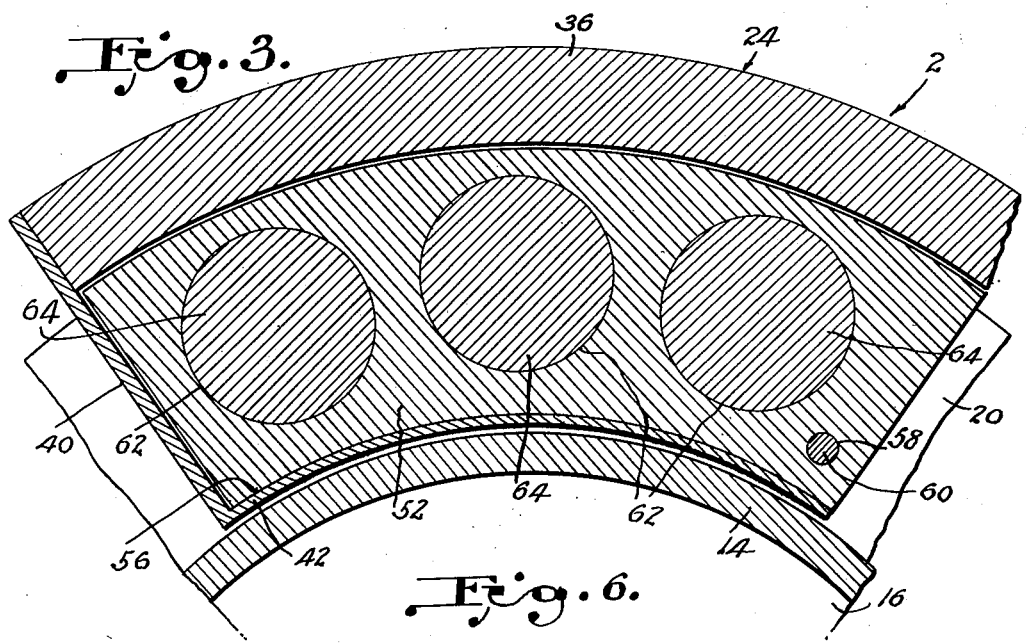
Fig. 3 is an enlarged longitudinal section taken vertically along the line 3—3 of Fig. 2.

Referring now to the drawings in which like reference numerals denote similar elements, the brake indicated generally at 2 is shown in Figs. 1 and 2 in its position of use on a front wheel assembly of an automobile. It will be understood that the front wheel and wheel supports are diagrammatically illustrated, these elements being conventional and including, in various adaptations to standard automobiles, a front wheel support 4, wheel bearing 6, hub 8, a plate 10 which rotates with the wheel, and studs 12 for mounting a wheel 13, the latter being shown only fragmentarily with the understanding that brake 2 is mounted inwardly of the wheel and tire and occupies a part of the space occupied by conventional drum type brakes.

The rotating parts of brake 2 including a drum 14 rigid with an annular inner flange 16 having stud holes 18 for mounting on the studs 12 inwardly of wheel 13 so that drum 14 rotates with wheel 13. Extending rigidly around drum 14 and integral therewith is a disc 20 the latter having an annular peripheral groove 22 for ventilating and cooling purposes hereinafter disclosed.

The non-rotating elements of brake 2 are, for the most part, enclosed within a hollow case 24, the case being fixedly supported as by welding on a mounting bracket 26, the mounting bracket is suitably fastened on the vehicle as indicated at 28.

Case 24, which may be formed of one or more rigidly and strongly joined elements, is generally sector-shaped and preferably occupies no more than 45° arc. As will be seen in Figs. 2, 5, and 6, particularly, case 24 enshrouds a portion of disc 20, the inner and outer side walls 32 and 34 of the case being disposed outwardly of respectively opposite sides of the disc while the top wall 36 of the case forms a rigid bridge between the side walls and overlies the outer periphery of a comparatively small portion of disc 20. Running lengthwise along the inner side of case top wall 36 is a central rib 38 spaced radially outward of the outer periphery of disc 20 sufficiently to provide clearance therebetween at all times. Extending across the forward end of case 24 is an end wall 40 having a slot (not shown) to provide clearance with the disc, and on the inward side of the case is an inner wall 42. Near the inner rear corners of case 24 are provided bolt holes 44 which pass through side walls 32 and 34 respectively and are outwardly countersunk as indicated at 46. The inner arcuate edges 47 of side walls 32 and 34 are spaced outwardly of drum 14 and the case parts thus far described define a pair of arcuate recesses 48 and 50 on respectively opposite sides of disc 20.

Closely engaging in arcuate recesses 48 and 50 are a pair of arcuate magazines 52 and 54 respectively, the latter being formed of solid, strong material. Each magazine has, near its inner rear corner, an internally threaded screw hole 58 which, when the magazines are engaged within case 24, register with screw holes 44 each for receiving a screw 60. It will be noted that the radially outer corner portions of magazines 52, on the sides of the magazines disposed towards disc 20 engage against central rib 38 so that, when the magazines are inserted and screws 60 are tightened, the magazines 52 and 54 are held within case 24 on opposite sides of disc 20.

Magazines 52 and 54 are each provided with a plurality of cylinders 62 bored nearly through from the inner sides thereof so as to leave solid closed outer end walls 63. Slidably fitting in cylinders 62 are plugs 64 of friction material and on the outer sides of each plug 64 is a skirted rubber piston 66 for driving plugs 64 inwardly in against disc 20 in response to pressure fluid input to the outer ends of cylinders 62. The term "rubber" as used herein covers the natural and synthetic products having rubber-like characteristics. Brake fluid passages 68 connect between the outer ends of cylinders 62 and a brake fluid input passage 70 is provided for each magazine. At the outer end of each brake fluid input passage 70 is a pipe fitting 72; an arched cross pipe 74 of stiff but flexible material connects pipe fitting 72 and connected to the cross pipe on the inner side of the assembly is a fluid input pipe 76 connected at its other end to the brake fluid system, not shown, conventionally used in automobiles. For purposes of this invention, it is sufficient to note that brake fluid under pressure enters the brake through supply pipe 76 when a brake pedal is depressed, and the fluid pressure in pipe 76 is released when the pedal is let up. Preferably bleeder passages 78 closed by a bleeder cap screw 80 is provided for each magazine so that air may be expelled from the fluid system when the caps are temporarily removed.

In operation, pressure fluid enters from input pipe 76 in equal amount and pressure to the input passages 70 in each magazine 52 and enters the outer closed ends of cylinders 62, thereby forcing rubber pistons 66 inwardly to compress plugs 64 against disc 20, thereby affecting the braking action. When the pressure fluid is released, the outward forces on plugs 64 resulting from the rotation of disc 20 plus the slight wobble inherent in the assembly is sufficient to move plugs 64 slightly outwardly and relieve their previous tight surface engagement against disc 20. In addition, when the brakes are applied, the friction-generated heat causes the disc to expand and thereby become slightly thicker. When the brakes are released, the disc cools and shrinks back to its original size so as to move its working surfaces slightly inward away from the plugs. In actual practice it has been found that the slight rubbing action of plugs 64 against disc 20 after the brakes have been applied is not sufficient to cause appreciable wear of the plugs.

Figure 6:
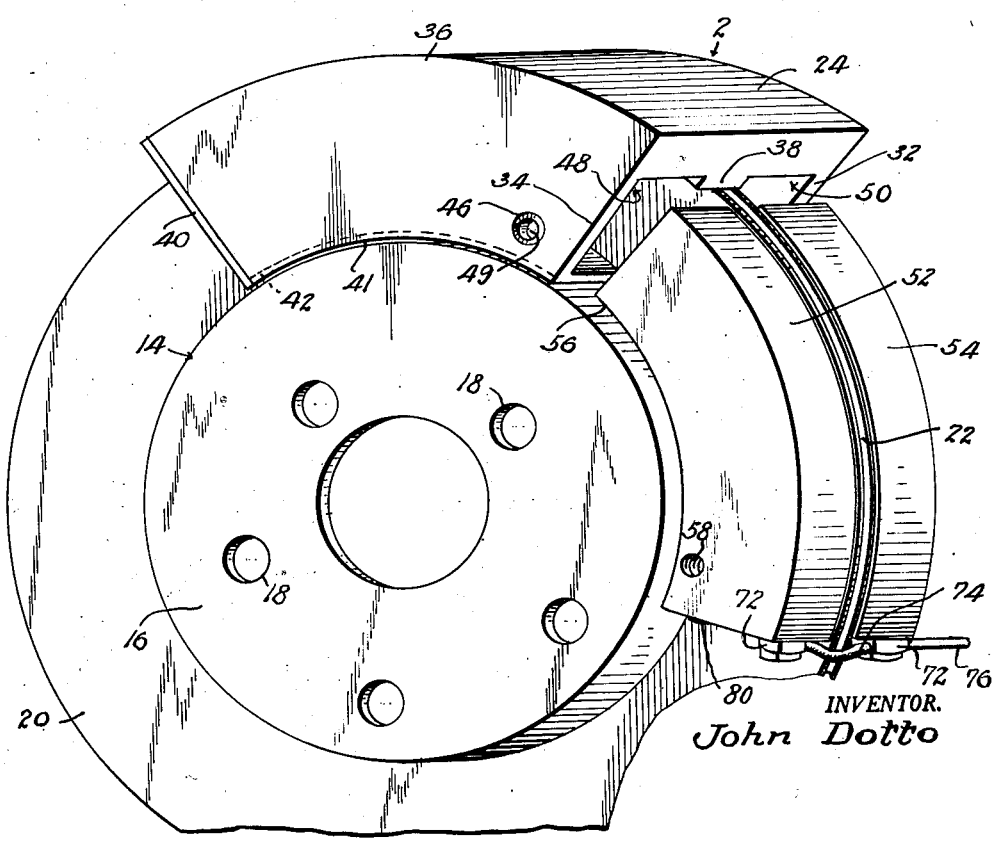

When it becomes necessary to inspect or replace plugs 64, the magazines 52 and 54 are removed from case 24 by removing screws 60 on each side, whereupon the magazines may be removed endwise from the case to the position shown in Fig. 6. Cross pipe 74 is formed of material sufficiently flexible so that the magazines may be spread to obtain immediate and direct access to the plugs 64 and, if necessary, rubber piston 66 in cylinders 62. With the magazines spread, plugs 64 can be easily removed by exerting slight pressure on the brake pedal of the pressure fluid system in which the brake is incorporated, it being recommended that only sufficient pedal pressure be applied to force the plug ends slightly outwardly where they can be grasped. As an alternate procedure during normal change or inspection of the plugs when the magazines are spread, the plugs 64 on one magazine may be manually pushed inwardly so as to force out the plugs on the opposite magazine. By exercising ordinary care, rubber piston 66 may be similarly removed without loss of brake fluid.

The magazines are then fitted endwise into case 24 and screws 60 are re-inserted and tightened and, after testing, bleeding, if necessary, by temporary removal of bleeder cap screws 80, the assembly is again ready for operation.

The operating temperature characteristics of the assembly are most favorable in that the great heat created by frictional engagement of the plugs against the disc is quickly dissipated by the disc as the latter spins in the open during the major part of its travel. Groove 22 not only extends the peripheral radiating surface of the disc, but also when the disc spins, it induces a current of cooling air through the open groove space.

The invention described above is not limited to the precise details of the disclosure, but is intended to cover all substitutions, modifications and equivalents within the scope of the following claims.

I claim:

1. In a brake, an annular disc adapted to rotate with a vehicle wheel, said disc having flat annular working faces on opposite sides thereof, a stationary support having portions thereof disposed on opposite sides of said disc, said support defining a pair of pockets on opposite sides of said disc, a pair of magazines removably disposed in said pockets, said magazines each including a block of material having an inner side disposed adjacent the disc and an outer side remote from the disc, a plurality of inwardly open cylinders extending in each of said blocks with their axes normal to the disc faces, the outer ends of said cylinders being closed, pistons slidably disposed in the outer ends of said cylinders, friction plugs slidably disposed in the inner ends of said cylinders, fluid passages extending through said block for transmitting pressure fluid to the outer ends of said cylinders outwardly of said pistons, fluid coupling means on said blocks for connecting said passages to a source of pressure fluid, and means for removably affixing said blocks in said pockets.

2. In a brake, an annular disc adapted to rotate with a vehicle wheel, said disc having flat annular working faces on opposite sides thereof, a stationary support of inverted U-shaped cross section having leg portions thereof disposed in outwardly spaced relation on opposite sides of said disc and a bight portion bracketing the disc periphery so as to define a pair of pockets on opposite sides of said disc, a pair of magazines removably disposed in said pockets, said magazines each including a block of material having an inner side disposed adjacent the disc and an outer side disposed remote from the disc, a plurality of inwardly open cylinders extending in each of said blocks with their axes normal to the disc faces, the outer ends of said cylinders being closed, pistons slidably disposed in the outer ends of said cylinders, friction plugs slidably disposed in the inner ends of said cylinders, fluid passages extending through said block for transmitting pressure fluid to the outer ends of said cylinders outwardly of said pistons, fluid coupling means on said blocks for connecting said passages to a source of pressure fluid, and means for removably affixing said blocks in said pockets.

3. In a brake, an annular disc adapted to rotate with a vehicle wheel, said disc having flat annular working faces on opposite sides thereof, a stationary support of inverted U-shape cross section having leg portions thereof disposed in outwardly spaced relationship on opposite sides of said disc and a bight portion bracketting the disc periphery and defining a pair of arcuate pockets on opposite sides of said disc, a pair of magazines removably disposed in said pockets, said magazines each including an arcuate block of material having an inner side disposed adjacent the disc and an outer side disposed against a leg portion of said support, a plurality of inwardly open cylinders extending in each of said blocks with their axes normal to the disc faces, the outer ends of said cylinders being closed, pistons slidably disposed in the outer ends of said cylinders, friction plugs slidably disposed in the inner ends of said cylinders, fluid passages extending through said block for transmitting pressure fluid to the outer ends of said cylinders outwardly of said pistons, fluid coupling means on said blocks for connecting said passages to a source of pressure fluid, and means for removably affixing said blocks in said pockets.

4. In a brake, an annular disc adapted to rotate with a vehicle wheel, said disc having flat annular working faces on opposite sides thereof, a stationary support of inverted U-shape cross section having leg portions thereof disposed in outwardly spaced relationship on opposite sides of said disc and a bight portion bracketting the disc periphery and defining a pair of arcuate pockets on opposite sides of said disc, one end of said pockets being open and the other end substantially closed, a pair of magazines removably disposed in said pockets, said magazines each including an arcuate block of material endwise engageable in and removable from a pocket and having an inner side disposed adjacent the disc and an outer side disposed against a leg portion of said support, a plurality of inwardly open cylinders extending in each of said blocks with their axes normal to the disc faces, the outer ends of said cylinders being closed, pistons slidably disposed in the outer ends of said cylinders, friction plugs slidably disposed in the inner ends of said cylinders, fluid passages extending through said block for transmitting pressure fluid to the outer ends of said cylinders outwardly of said pistons, fluid coupling means on said blocks for connecting said passages to a source of pressure fluid, and means for removably affixing said blocks in said pockets.

5. The combination claimed in claim 4, said support having a rib centrally disposed along the inner side of said bight portion and constituting a guide member for said blocks.

6. In a brake, an annular disc adapted to rotate with a vehicle wheel, said disc having flat annular working faces on opposite sides adjacent the periphery thereof, a stationary case enshrouding a sector of the disc periphery, said case being substantially of inverted U-shape in cross section and having leg portions thereof disposed in laterally outward spaced relationship with the working faces of said disc and having a bight portion rigidly connecting the leg portions and spaced radially outward adjacent the disc periphery, said case having an open end, the leg and bight portions of the case defining a pair of open ended pockets on opposite sides of said disc, a pair of magazines disposed in said pockets, said magazines being insertable and removable through the open ends of the pockets, said magazines each including a block of material substantially filling a pocket and having an inner side disposed adjacent the disc and an outer side disposed against a leg of the case, a plurality of inwardly open cylinders extending in each of said blocks with their axes normal to the disc faces, the outer ends of said cylinders being closed, pistons slidably disposed in the inner ends of said cylinders, fluid passages extending through said block for transmitting pressure fluid to the outer ends of said cylinders outwardly of said pistons, fluid coupling means on said blocks for connecting said passages to a source of pressure fluid, and means for removably affixing said blocks in said pockets.

7. The combination claimed in claim 6, said disc having a groove extending around the periphery thereof, whereby to extend the surface thereof and to provide an air passage between the disc periphery and the bight portion of the case.

8. In a brake, an annular disc adapted to rotate with a vehicle wheel, said disc having flat annular working faces on opposite sides adjacent the periphery thereof, a stationary case enshrouding a sector of the disc periphery, said case being substantially of inverted U-shape in cross section and having leg portions thereof disposed in laterally outward spaced relationship with the working faces of said disc and having a bight portion rigidly connecting the leg portions and spaced radially outward adjacent the the disc periphery, said case having an open end, the leg and bight portions of the case defining a pair of open ended pockets on opposite sides of said disc, a pair of magazines disposed in said pockets, said magazines being insertable and removable through the open ends of the pockets, said magazines each including a block of material substantially filling a pocket and having an inner side disposed adjacent the disc, an outer side disposed against a leg of the case, and one end exposed to the exterior at the open end of the case, a plurality of inwardly open cylinders extending in each of said blocks with their axes normal to the disc faces, the outer ends of said cylinders being closed, pistons slidably disposed in the outer ends of said cylinders, friction plugs slidably disposed in the inner ends of said cylinders, fluid passages extending through said block for transmitting pressure fluid to the outer ends of said cylinders outwardly of said pistons, fluid coupling means on the exposed ends of said blocks for connecting said passages to a source of pressure fluid, and means for removably affixing said blocks in said pockets.

9. In the combination claimed in claim 8, a flexible cross-pipe connecting the fluid coupling means, and a flexible fluid supply pipe connected to said cross-pipe.

10. In a brake, a cylindrical drum adapted to rotate with a vehicle wheel, a flat annular disc rigid with said drum and forming a central flange therearound, said disc having flat annular working faces on opposite sides thereof, a stationary case enshrouding a sector of the disc, said case being substantially of inverted U-shape in cross section and having leg portions thereof constituting sidewalls disposed in laterally outward spaced relationship with the working faces of said disc and having a bight portion constituting a top wall rigidly connecting the sidewalls and spaced radially outward adjacent the disc periphery, the inner edges of said sidewalls being arcuate and radially outward adjacent the drum periphery, said case having an open end, the side and top walls of the case defining a pair of open ended pockets on opposite sides of said disc, a pair of magazines disposed in said pockets, said magazines being insertable and removable through the open ends of the pockets, said magazines each including a block of material substantially filling a pocket and having an inner side disposed adjacent the disc and an outer side disposed against a leg of the case, a plurality of inwardly open cylinders extending in each of said blocks with their axes normal to the disc faces, the outer ends of said cylinders being closed, pistons slidably disposed in the outer ends of said cylinders, friction plugs slidably disposed in the inner ends of said cylinders, fluid passages extending through said block for transmitting pressure fluid to the outer ends of said cylinders outwardly of said pistons, fluid coupling means on said blocks for connecting said passages to a source of pressure fluid, and means for removably affixing said blocks in said pockets.

11. In a brake, a cylindrical drum adapted to rotate with a vehicle wheel, a flat annular disc rigid with said drum and forming a central flange therearound, said disc having flat annular working faces on opposite sides thereof, a stationary case enshrouding a sector of the disc periphery, said case being substantially of inverted U-shape in cross section and having leg portions thereof constituting sidewalls disposed in laterally outward spaced relationship with working faces of said disc and having a bight portion arcuate in side elevation constituting a top wall rigidly connecting the sidewalls and spaced radially outward adjacent the disc periphery, the inner edges of said sidewalls being arcuate and radially outward adjacent the drum periphery, said case having an open end, the side and top walls of the case defining a pair of lengthwise arcuate open ended pockets on opposite sides of said disc, a pair of magazines disposed in said pockets, said magazines being insertable and removable through the open ends of the pockets, said magazines each including a lengthwise arcuate block of material substantially filling a pocket and having an inner side disposed adjacent the disc and an outer side disposed against a leg of the case, a plurality of inwardly open cylinders extending in each of said blocks with their axes normal to the disc faces, the outer ends of said cylinders being closed, pistons slidably disposed in the outer ends of said cylinders, friction plugs slidably disposed in the inner ends of said cylinders, fluid passages extending through said block for transmitting pressure fluid to the outer ends of said cylinders outwardly of said pistons, fluid coupling means on said blocks for connecting said passages to a source of pressure fluid, and means for removably affixing said blocks in said pockets.

References Cited in the file of this patent

UNITED STATES PATENTS

| | | |
|---|---|---|
| 1,617,276 | Sarff | Feb. 8, 1927 |
| 1,842,259 | Frankland | Jan. 19, 1932 |
| 2,380,085 | Tack | July 10, 1945 |
| 2,411,067 | Tack | Nov. 12, 1946 |
| 2,531,341 | Meador | Nov. 21, 1950 |
| 2,603,316 | Pierce | July 15, 1952 |
| 2,614,662 | Hawley | Oct. 21, 1952 |
| 2,754,936 | Butler | July 17, 1956 |